United States Patent [19]

Hashimoto et al.

[11] 3,973,267
[45] Aug. 3, 1976

[54] EXPOSURE CONTROL APPARATUS FOR A CAMERA

[75] Inventors: Teiji Hashimoto, Kawasaki; Seiichi Matsumoto, Yokohama; Tetsuya Taguchi, Kawasaki; Takehiko Kiyohara, Zama; Tokuichi Tsunekawa, Yokohama, all of Japan

[73] Assignee: Canon Kabushiki Kaisha, Tokyo, Japan

[22] Filed: Dec. 19, 1974

[21] Appl. No.: 534,578

[30] Foreign Application Priority Data
Dec. 25, 1973 Japan................................ 49-1215

[52] U.S. Cl................................. 354/43; 354/29; 354/60 E
[51] Int. Cl.²........................................ G03B 7/08
[58] Field of Search................ 354/26, 29, 30, 43, 354/50, 51, 40, 60 R, 60 EI

[56] References Cited
UNITED STATES PATENTS

| | | |
|---|---|---|
| 3,678,826 | 7/1972 | Mori et al............................. 354/51 |
| 3,690,230 | 9/1972 | Mori et al............................. 354/51 |
| 3,750,540 | 8/1973 | Yanagisawa et al.............. 354/51 X |
| 3,863,263 | 1/1975 | Itagaki................................. 354/50 |

Primary Examiner—L. T. Hix
Assistant Examiner—James LaBarre
Attorney, Agent, or Firm—Toren, McGeady and Stanger

[57] ABSTRACT

The present invention relates to an exposure control apparatus for a camera which is so designed that the output terminal of the light measuring circuit of the brightness of the object to be photographed having a photo electric transducing means is connected to one input terminal of an operation amplifier. The output of the photographing information setting circuit, having a variable resistance means for setting other photographing informations than the information of the brightness of the object to be photographed, is connected to the other input terminal of the above mentioned operation amplifier. This is done in such a manner that proper exposure conditions can be obtained by means of the output of the exposure control circuit connected to the output of the above mentioned operation amplifier. Each input signal to the operational amplifier is adjusted by a bias signal which is controlled in accordance with ambient temperature conditions.

5 Claims, 11 Drawing Figures

FIG.1 PRIOR ART
FIG.2 PRIOR ART
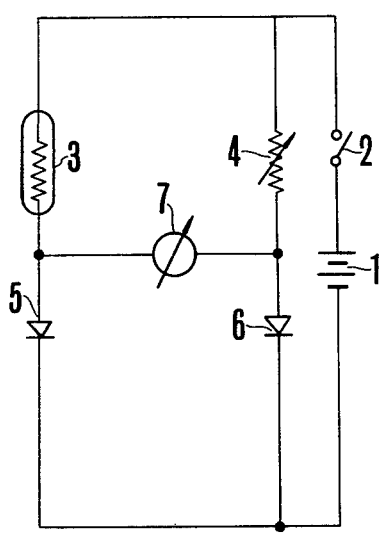
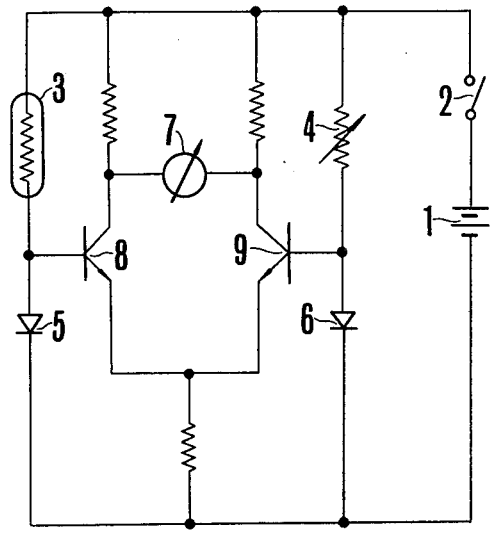
FIG.3
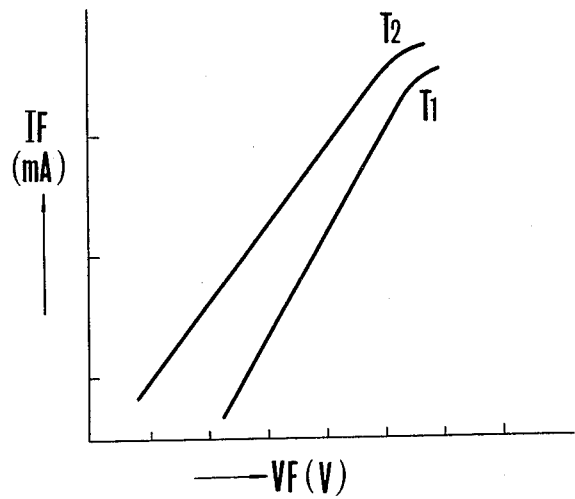

180
EXPOSURE CONTROL APPARATUS FOR A CAMERA

BACKGROUND OF THE INVENTION

1. Field of the Invention

The present invention relates to an exposure control apparatus for a camera by means of which the information of the brightness of the object to be photographed and other photographing informations are operated so as to obtain a proper exposure.

2. Description of the Prior Art

Until now, such exposure control apparatus have been widely used that are so designed that, by means of an output of the operation amplifier combined with the output of a photo electric transducing means like SBC or, an ampere meter is controlled. This is done in such a manner that the shutter time or the aperture value is obtained by means of the indication of the ampere meter.

However, in case of such apparatus, the above mentioned operation amplifier is used only as means for amplifying the output of the photo electric transducing means whereby the photographing informations such as the film sensitivity, the shutter time or the aperture value are introduced by rotating the ampere meter itself. Therefore, the composition of such apparatus is unavoidably very complicated.

Until now, in order to overcome such shortcoming as mentioned above, it has been proposed that, as shown in FIG. 1, a bridge circuit consisting of the photo sensitive element 3, the variable resistance 4 for setting the photographing informations and the logarithmically compressing diodes 5 and 6 is connected to the current source 1 through the switch 2. Accordingly the ampere meter 7 is connected to the output terminal of the above mentioned bridge circuit in such a manner that the ampere meter 7 is controlled by means of a current according to the polarity of the unbalance voltage of the above mentioned bridge circuit. Further, it has also been proposed to connect the differential amplifying circuit consisting of the transistors 8 and 9 between the bridge circuit and the ampere meter 7, so as to control the ampere meter 7 as shown in FIG. 2.

Even by means of such apparatus as mentioned above, a complete temperature compensation can be obtained when the current flowing through the right logarithmically compressing diode 5 and that flowing through the left logarithmically compressing diode 6 are equal to each other while depending upon the value of the brightness of the object to be photographed and that of other photographing informations, the value of the current flowing through the diode 5 and that of the current flowing through the diode 6 are different from each other. This current difference is such a difference between the temperature characteristics of the logarithmically compressing diode 5 and that of the logarithmically compressing diode 6 is caused to take place so as to bring about an exposure error. FIG. 3 shows the temperature characteristics of logarithmically compressing diode whereby, along the abscissa, the forward voltage VF and along the ordinate the forward current IF is shown. When the ambient temperature T is increased from $T_1$ up to $T_2$, the VF - IF characteristics of the diode is varied as shown in the drawing. Thus, it is understood that depending upon the temperature, the voltage between both terminals of the logarithmically compressing diode varies whereby depending upon its current value, the quantity of the variation is also varied in case a constant current runs through the diode.

The first purpose of the present invention therefore is to obtain the proper exposure by controlling the exposure control circuit, by means of the operation amplifying circuit the first input of which is the information of the brightness of the object to be photographed and the second input of which is other photographing informations.

The second purpose of the present invention is to obtain a complete temperature compensation of the compressed information of the brightness of the object to be photographed and other compressed informations for the whole light measuring range.

The third purpose of the present invention will be disclosed in the course of the explanation to be made below as to the embodiments of the present invention.

BRIEF DESCRIPTION OF THE DRAWINGS

FIG. 1 shows the circuit diagram of a conventional exposure control device.

FIG. 2 shows the circuit diagram of FIG. 1, in which a differential amplifying circuit is provided.

FIG. 3 shows the diagram of the voltage-current characteristics of the compressing diode.

DESCRIPTION OF THE PREFERRED EMBODIMENTS

Figure 4:
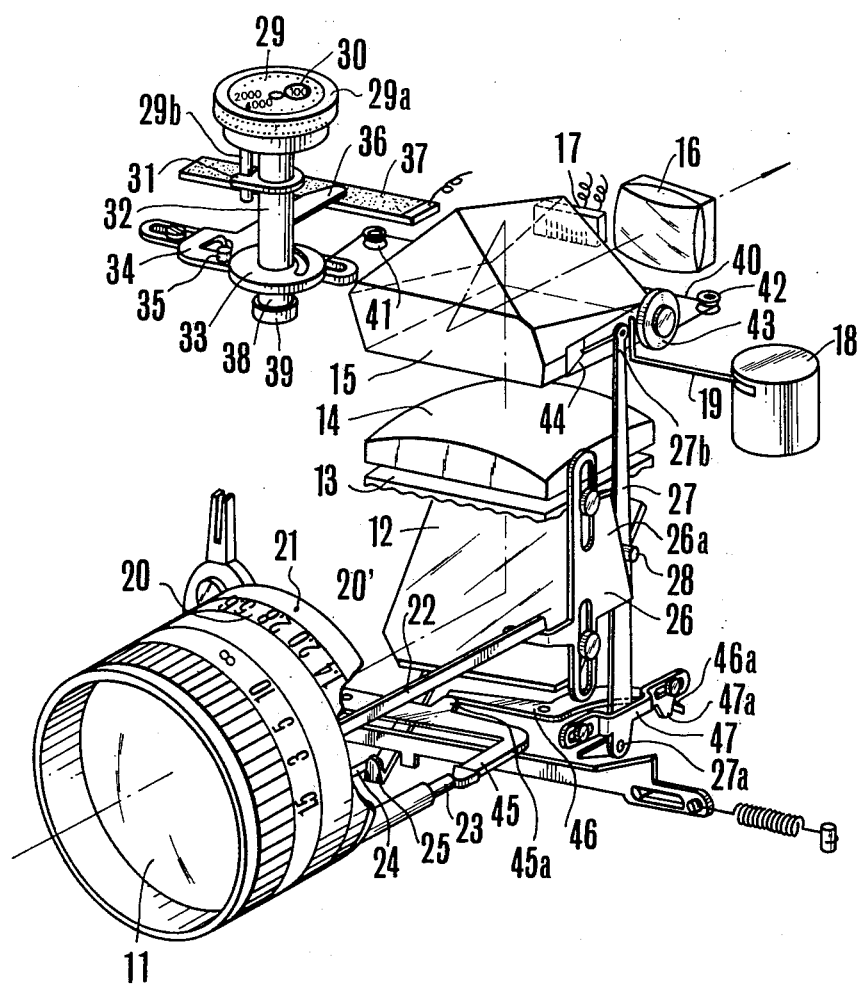
FIG. 4 shows the composition of an embodiment of the exposure control apparatus according to the present invention.

Below, the present invention will be explained in detail according to the drawings of an embodiment of the present invention. FIG. 4 shows the exposure control mechanism of camera, whereby 11 is the photographing lens. The light, having passed through this photographing lens, is directed to the eye piece 16 through the reflecting mirror 12, the focussing plate 13, the condensor lens 14 and the pentagonal prism 15. Further, a part of the light coming from the pentagonal prism 15 is directed into photo sensitive element 17 such as a silicone blue cell or CdS. Depending upon the quantity of the light directed into the photo sensitive element 17, the deflection of the indication finger 19 of the ampere meter 18 is determined as will be explained later. 20 is the preset aperture ring provided on the barrel of the photographing lens, whereby the ring 20 presents the aperture scale 20' on the circumference in such a manner that, by manually setting the scale 20' on the fixed index 21 provides on the barrel body, the aperture is conveyed to the body through the accompanying movement of the preset aperture lever 22. 23 is an information pin for the open F value (hereinafter called FNO), whereby the projecting length of the pin 23 is changed according to the lenses having different FNO. 24 is the automatic aperture lever which keeps the aperture in the opened state before the operation of the shutter release but drives the aperture up to a certain predetermined value through the rotation of the automatic aperture driving lever 25 at the side of the body by the operation of the shutter release.

26 is the lever movable according to the aperture signal in engagement with the preset aperture lever 22, whereby the cam part 26a of this lever 26 movable according to the aperture signal is engaged with the pin 28 provided on the follower finger 27. Thus, in functional engagement with the upward and the downward movement of the lever 26 moveable according to the aperture signal, the follower finger 27b is rotated around the fulcrum 27a as center, whereby this follower finger 27b and the indication finger 19 of the ampere meter 18 can be seen in the view finder. 29 is the shutter dial which is so designed that the sensitivity of the film to be used is set in the film sensitivity indication window 30 by bringing up the external edge 29a of this shutter dial and rotating it. The shutter dial 29 being rotated, this rotation is transmitted to the cam 33 by means of the pin 29b, the fork lever 31 and the shaft 32 whereby due to the rotation of the cam 33, the slide lever 34 is moved by means of the pin 35. The brush 36 provided on the slide lever 34 thus slides in such a manner that the resistance value of the variable resistance 37 is determined. The variable resistance 37 is set at a resistance value according to the signal corresponding to the sum of the shutter time signal set by means of the shutter dial 29 and the film sensitivity signal. Further, the end of the string 40 wound up around the pulley 39 provided at the end of the shaft 38 directly connected to the shutter dial is wound up around the shutter time indication plate 43 through the pulleys 41 and 42. Thus, according to the switching over the shutter dial 29, the information indication plate 43 is rotated. The shutter time value of this information indication plate 43 is directed to the pentagonal prism 17 through the prism 44 and is indicated in the view finder. Further, the photographing lens 11 is interchangeable so that it is necessary to equip the exposure control mechanism with a correction means of the exposure because the difference of the brightness of various photographing lens 11 causes the different output of the photoelectric transducing member 17. Thus, according to the lenses with different FNO, the projecting length of the pin 23 changes so that by pushing the lever 45 at the side of the body, the lever 45 is rotated anti-clockwise according to the projecting length of this pin 23. The projecting part 45a of the lever 45 is engaged with the lever 46. Thus, the lever 46 is rotated clockwise, so as to move the rotation shaft bearing member 47 to the left because the end 46a of the lever 46 is engaged with the claw 47a of the rotation shaft bearing member 47. By means of the movement of the rotation shaft bearing member 37, the follower finger member 27 rotates the follower finger 27b around the pin 28 as fulcrum clockwise. Namely, the quantity of the rotation of the follower finger 27b is determined by the FNO of the photographing lens.

It goes without saying that, as the correction means of the above mentioned FNO part of the above mentioned means a variable resistance apparatus, whose electric value is varied according to the rotation of, for example, a lever 45, can be provided, so as to apply the FNO signal of the resistance value of the variable resistance to the exposure control circuit. Below, the exposure control circuit of the above mentioned apparatus will be explained according to FIG. 5, whereby 17a and 37 are respectively the photo conductive element as photo sensitive element shown in FIG. 4 and the variable resistance, while 18 is the ampere meter as is shown in FIG. 4. $E_1$ and $E_2$ are the current sources which are so designed as to apply the voltage to the operation amplifier OP through the switches $S_1$ and $S_2$. $F_1$ is the circuit of the information of the brightness of the object to be photographed consisting of a series circuit of the photo conductive element 17a and the diode D whereby the connecting point of the photo conductive element 17a and the diode D is connected to the input terminal B of the operation amplifier OP. Further, the output of the operation amplifier OP is negatively fed back to the input terminal B by means of the diode D.

$F_2$ is the photographing information circuit consisting of the series circuit of the resistance $R_1$ and the variable resistance 37, whereby the connecting point between the resistance $R_1$ and the variable resistance 37 is connected to the input terminal A of the operation amplifier OP. The resistance $R_1$ is intended to apply the proper input bias to the input terminal A, while the variable resistance 37 is intended to vary the input level to the input terminal A according to other exposure signal than the brightness of the object to be photographed. $F_3$ is the meter circuit consisting of the series circuit of the resistance $R_3$ and the ampere meter 18 and connected to the output terminal of the operational amplifier OP. $R_3$ is the correction resistance which is intended to correct the characteristics of the voltage generated between both terminals of the meter 18. Because the current logarithmically compressed according to the characteristics of the diode D is fed back to the input side, voltages are generated between both terminals of the meter 18 which differ from one another by the same potential difference of for example, 16 – 20 mV for the change of the brightness by one step. Accordingly, current flows through the meter due to the above mentioned voltage and to the internal resistance RM.

Below the operation of the above mentioned mechanism will be explained. At first, the shutter time is set to the shutter dial 29 while the film sensitivity value is set to the sensitivity indication window. By the above mentioned operation, the shutter time signal and the film sensitivity value signal are transduced into a signal in form of the resistance value of the variable resistance 37 and applied to the one input terminal A of the operation amplifier OP of the exposure control circuit. When the photographing lens 11 is directed to the object to be photographed, the photographing light is reflected by means of the mirror 12 and directed into the photoelectric transducing element 17a which gives out as output the signal of the brightness of the object to be photographed which signal is directed to the other input terminal B of the operation amplifier OP of the exposure control circuit. The above mentioned various signals are processed by the operation amplifier in such a manner that the output of the above mentioned amplifier as the result of the operation moves the indication finger 19 of the meter 18 up to the position, so as to indicate the proper aperture value. By operating the preset aperture ring 20 in such a manner that the follower finger 27b forming the end of the follower finger member 27 is aligned with the indication finger 19, the preset aperture ring 20 is set to the proper aperture value. When then the shutter button, not shown in the drawing, is pushed, the automatic aperture driving lever 25 is rotated clockwise so as to rotate the automatic aperture lever 24 in engagement with the lever 25 and drive the aperture up to a certain determined value. At the same time, the reflecting mirror 12 rises up in such a manner that the mirror rise up termination signal for the shutter not shown in the drawing is operated, so as to carry out the exposure with the shutter time set at the shutter dial 29.

Figure 5:
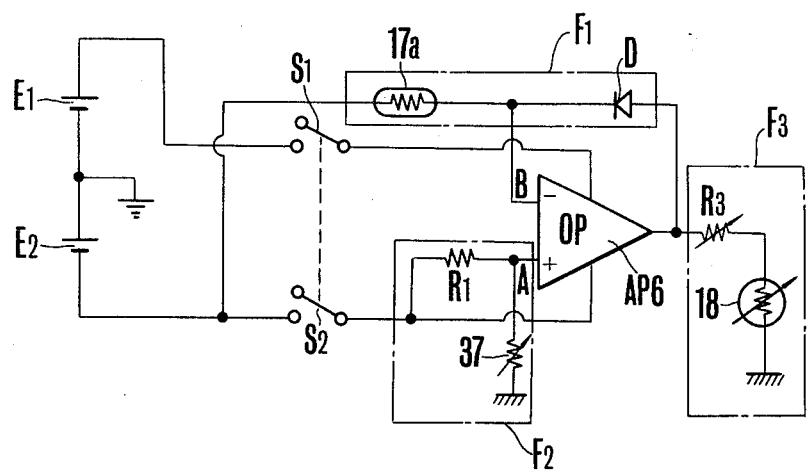
FIG. 5 shows the circuit diagram of the exposure control apparatus shown in FIG. 4.
Figure 6:
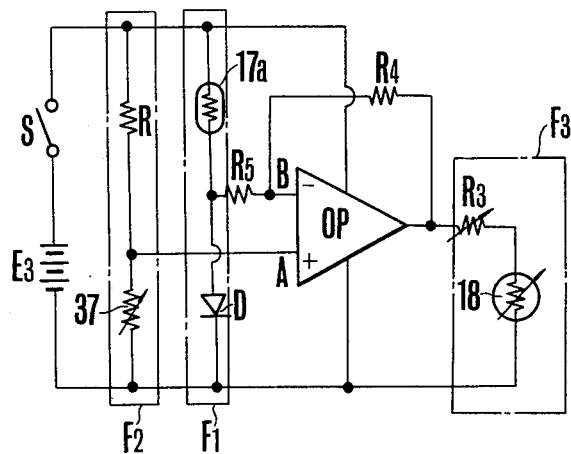
FIG. 6 shows the circuit diagram of FIG. 5, whereby the connected state of the logarithmically compressing diode is changed.

FIG. 6 shows the circuit shown in FIG. 5 in which the connected state of the diode D is changed whereby the same parts as those in FIG. 5 present the same figures. $E_3$ is the current source which is intended to apply the proper voltage to the operation amplifier OP by closing the switch S. 17a is the photo conductive element which gives to the diode D a current proportional to the light directed in, whereby the voltage generated by the diode D is the one logarithmically compressed according to the characteristics of the diode. The voltage generated by the diode D as the signal of the brightness of the object to be photographed is applied to the input terminal B through the resistance $R_5$. $R_4$ is the feed back resistance while $R_3$ is the correction resistance. $R_1$ is the resistance which is intended to apply the proper input bias to the input terminal A, while the variable resistance 37 is the one which is intended to alter the input level at the input terminal A, reacting with the exposure signal of other objects than the one to be photographed. When now, according to the shutter time setting at the shutter dial the value of the variable resistance $R_2$ is set, the level voltage as the shutter time signal is applied to the input terminal A.

On the other hand, by means of the resistance value of the photoconductive element 17 in response to the brightness of the object to be photographed, a voltage as the signal of the brightness of the object to be photographed is applied to the input terminal B. Because the output voltage of the operation amplifier OP is proportional to the difference of the input signals, the voltage generated by the meter 18 represent an element of the exposure, for example, the aperture signal so that from the indication of the indication finger of the meter 18, the proper exposure can be understood.

Figure 7:
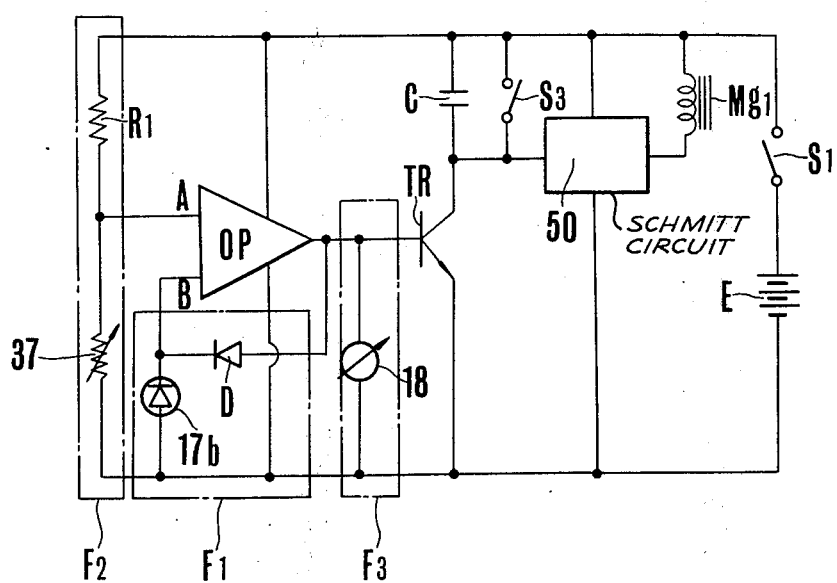
FIG. 7 shows the circuit diagram of FIG. 5, in which the shutter time control circuit is provided while a photo voltaic element is applied as photo sensitive element.

FIG. 7 shows the circuit of FIG. 5, in which the shutter time control circuit is adopted while as photo sensitive element, a photo voltaic element is used, whereby the same elements as those of FIG. 5 present the same figure. $R_1$ is the resistance intended to apply the proper input bias to the input terminal A, while 37 is the variable resistance in which the exposure signal such as the film sensitivity or the shutter time signal is set and which is connected to the one terminal A of the operation amplifier OP. 17b is a photo voltaic element, such as a photoelectric transducing element, which is intended to apply a voltage proportional to the incident light to the input terminal B of the operation amplifier OP. The diode D forming the feed back resistance feeds back a current compressed according to the characteristics of the diode D to the input side, so that the variation of the output of the operation amplifier OP is compressed. The output voltage of the operation amplifier OP is applied to the meter 18 by means of whose indication finger the proper exposure, for example, the proper shutter time can be detected. On the other hand, the output voltage of the operation amplifier OP is applied to the base of the transistor Tr, so that the enlarged current depending upon the above mentioned voltage flows in the collector side of the transistor Tr. With this collector current the condensor C is charged until the voltage reaches a certain determined potential at which point the Schmitt circuit 50 is triggered. This is done such that the circuit current of the electromagnet $Mg_1$ connected between the above mentioned Schmitt circuit and the current source E is interrupted. It is possible to obtain the proper exposure by controlling the holding time of the rear part of the focal plane shutter by means of the above mentioned magnet $Mg_1$.

When the switch $S_3$ is closed, the current source E gives a proper voltage to the exposure control circuit, while the switch $S_3$ itself is functionally engaged with, for example, the shutter button so as to release the short circuitting of the condensor C.

Figure 8:
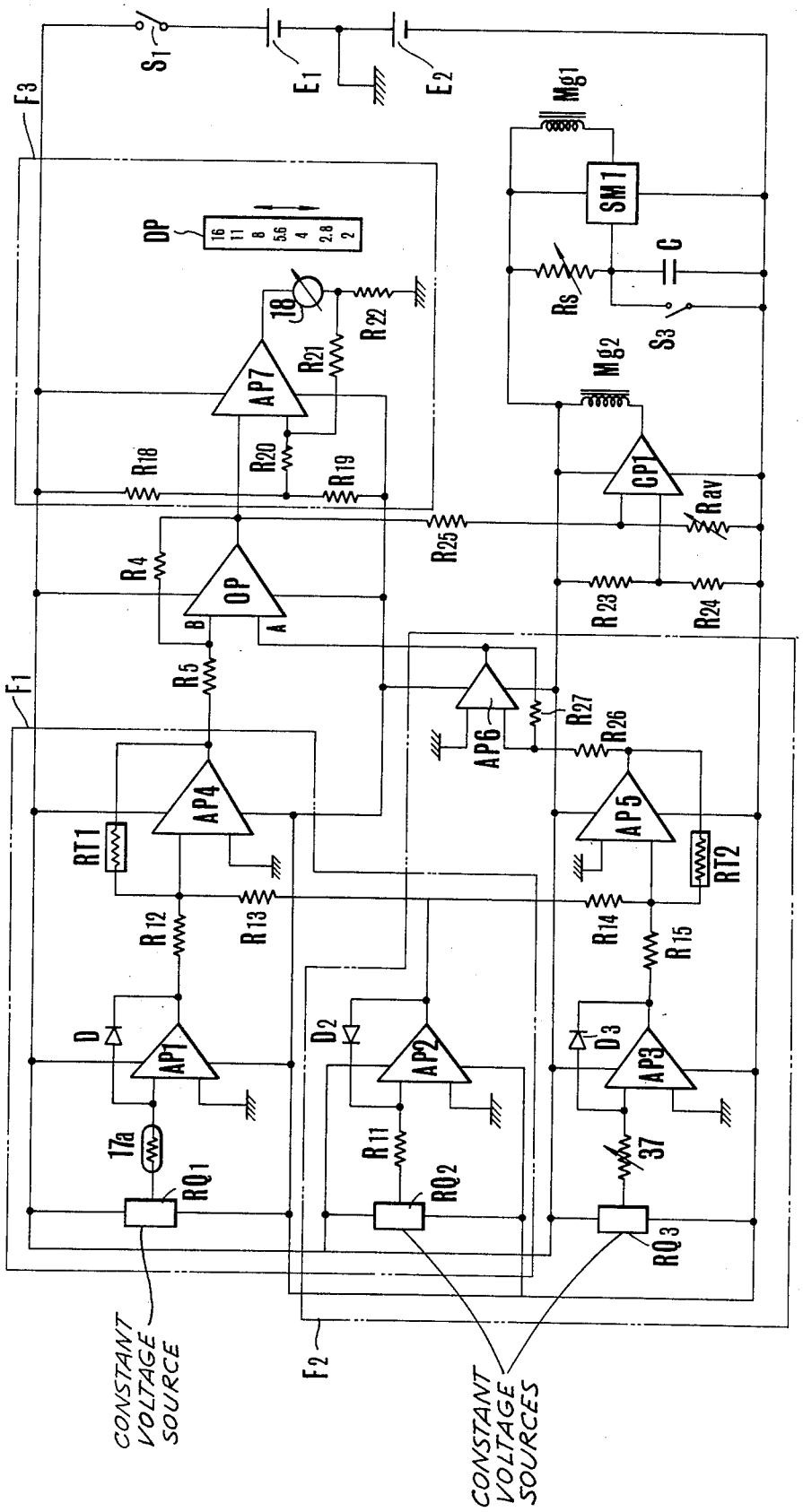
FIG. 8 shows the circuit diagram of FIG. 6, in which a temperature compensating circuit is provided.

FIG. 8 shows the circuit of FIG. 6, in which the temperature compensation circuit is provided, whereby the same elements as those of FIG. 6 present the same figures. $F_1$, $F_2$ and $F_3$ are respectively the circuit for the information of the brightness of the object to be photographed, the photographing circuit and the meter circuit of FIG. 6. $E_1$ and $E_2$ are the current sources which are connected in parallel with the constant voltage sources $RQ_1$, $RQ_2$ and $RQ_3$ for level setting through the switch $S_1$. These constant voltage sources $RQ_1$, $RQ_2$ and $RQ_3$ are respectively intended to apply a constant voltage to the first input terminal of the operational amplifiers $AP_1$, $AP_2$ and $AP_3$ respectively, through the photo conductive element 17a, the resistance $R_{11}$ and the variable resistance 37. The variable resistance 37 contains the difference information resistance SV - TV (SV: film sensitivity, TV: shutter time), the information resistance $R_{AVC}$ is a resistance for curve compensation near fully opened apertures of a large aperture lens, and the information resistance $R_K$ is a compensation resistance for intentionally compensating exposure for example at the time of photographing against light. The second input terminal of the operation amplifiers $AP_1$, $AP_2$ and $AP_3$ is grounded. Further, the output terminal of the operation amplifier $AP_1$, $AP_2$ and $AP_3$ is connected with the first input terminal of the same operational amplifiers $AP_1$, $AP_2$ and $AP_3$ through the logarithmically compressing diodes D, $D_2$ and $D_3$. Further, the output of the operational amplifiers $AP_1$ and $AP_3$ is connected with the first input terminal of the operational amplifiers $AP_4$ and $AP_5$ through the resistances $R_{12}$ and $R_{15}$. Further, the output terminal of the operational amplifier $AP_2$ is connected with the first input terminal of the operational amplifier $AP_4$ and $AP_5$ through the resistances $R_{13}$ and $R_{14}$. The second input terminal of the operational amplifiers $AP_4$ and $AP_5$ is grounded. The output terminal of the operation amplfiers $AP_4$ and $AP_5$ is connected with the first input terminal of the same operational amplifiers $AP_4$ and $AP_5$ through the temperature compensation resistance $RT_1$ and $RT_2$. The output terminal of the operational amplifier $AP_4$ is connected with the input terminal B of the operational amplifier OP through the above mentioned resistance $R_5$. The output of the operational amplifier $AP_5$ is connected with the first input terminal of the operational amplifier $AP_6$ through the resistance $R_{26}$. The second input terminal of this operational amplifier $AP_6$ is grounded, while the output terminal of the operational amplifier $AP_6$ is connected with the first input terminal of the operation amplifier $AP_6$ through the resistance 27. The output of this operational amplifier $AP_6$ is connected with the input terminal A of the operational amplifier OP. The output terminal of this operational amplifier OP is connected with the input terminal B of the operational amplifier OP through the resistance $R_4$. The output terminal of the operational amplifier OP is connected with the first input terminal of the operational amplifier $AP_7$, while the second input terminal of this operational amplifier $AP_7$ is connected with the connecting point of the resistances $R_{18}$ and $R_{19}$ through the resistance $R_{20}$. The output terminal of this operational amplifier $AP_7$ is connected with the ampere meter 18 and the resistance $R_{22}$ in series, while the connecting point of this resistance $R_{22}$ and the ampere meter 18 is connected to the second input terminal of the operational amplifier $AP_7$ through the resistance $R_{21}$. The output terminal of the above mentioned operational amplifier OP is connected to the first input terminal of comparator $CP_1$ through the resistance $R_{25}$ and the variable resistance $R_{av}$ for aperture setting is also connected. Further, the second input terminal of the comparator $CP_1$ is connected with the connecting point of the resistances 23 and 24, while the output terminal of the comparator $CP_1$ is connected with the magnet $Mg_2$ for aperture setting. $SM_1$ is the Schmitt trigger whose input terminal is connected with the connecting point of the variable resistance Rs for shutter time setting and the condensor C connected in parallel with the switch $S_3$, while the output terminal of the trigger circuit $SM_1$ is connected with the magnet $Mg_1$ for shutter time setting.

With the constant voltage current sources $RQ_1$, $RQ_2$ and $RQ_3$ for level setting being properly set, the current flowing through the diode for logarithmically compressing the measured light being $ip$ and the standard current corresponding to the photo current $ip$ for temperature compensation of the amplifier $AP_1$ for measuring the brightness of the object to be photographed at the standard brightness be $is$. When the constant voltage current source $RQ_2$ for level setting and the resistance $R_{11}$ are adjusted in such a manner that the current $is$ flows in the diode $D_2$ of the amplifier $AP_2$ for temperature compensation, the output voltages $VA_1$ and $VA_2$ of the amplifiers $AP_1$ and $AP_2$ can be expressed as follows.

$$VA_1 = -\frac{kT}{q} \ln(\frac{ip}{io} + 1)$$
$$VA_2 = \frac{kT}{q} \ln(\frac{is}{io} + 1).$$

wherein
 $q$ : quantum of electricity
 $k$ : Boltzman's constant
 $T$ : absolute temperature
 $i_o$: saturation current in inverse direction of diodes $D_1$, $D_2$, $D_3$
 $i_p$: photosignal current flowing through diode $D_1$
 $i_s$: biasing current flowing through diode $D_2$ Thus the output voltage $VA_4$ of the amplifier $AP_4$ can be expressed as follows.

$$VA_4 = \left\{\frac{1}{R_2} \cdot \frac{kT}{q} \ln(\frac{ip}{io}+1) - \frac{1}{R_3} \cdot \frac{kT}{q} \ln(\frac{is}{io}+1)\right\} \cdot RT_1$$

Let $ip \cdot is \gg io$, $R_{12} = R_{13} = R$, so $$VA_4 = \frac{RT_1}{R} \cdot \frac{kT}{q} \ln(\frac{ip}{is})$$

When the resistance $RT_1$ for temperature compensation can be expressed as follows $$RT_1 = Ro \cdot \frac{T_o}{T} = R_o(1 - \frac{1}{T}(T - T_o))$$

namely, the temperature coefficient $$\alpha \text{ is } -\frac{1}{T} (\alpha = -\frac{1}{T}),$$

$VA_4$ in the present circuit can be expressed as follows $$VA_4 = \frac{R_o}{R} \cdot \frac{kT_o}{q} \ln(\frac{ip}{is}).$$

Therefore, the information $ip$ of the brightness of the object to be photographed is logarithmically compressed by $AP_1$ and compensated in view of temperature by $AP_2$ and $AP_4$ in such a manner that the logarithmically compressed output voltage independent of the temperature is generated at the output terminal of the amplifier $AP_4$. When on the other hand, the photographing information, namely the sum of the currents $isv - Tv$, $i_{AVC}$, $ik$ flows in the information operation compressing amplifier $AP_3$, the output voltage $VA_3$ of $AP_3$ is $$VA_3 = -\frac{kT}{q} \ln(\frac{isv - Tv + i_{AVC} + ik}{i_o} + 1)$$

so that the output voltage $VA_5$ of the amplifier $AP_5$ is $$VA_5 = \left\{\frac{1}{R_{15}} \cdot \frac{kT}{q} \ln(\frac{isv - Tv + i_{AVC} + ik}{i_o} + 1) - \frac{1}{R_{14}} \cdot \frac{kT}{q} \ln(\frac{is}{i_o}+1)\right\} RT_2$$

Hereby let $isv - Tv + i_{AVC} + ik$, $is \gg i_o$, $R_{15} = R_{14} = R$, so $$VA_5 = \frac{RT_2}{R} \cdot \frac{kT}{q} \cdot \ln(\frac{isv + Tv + i_{AVC} + ik}{is})$$

When the resistance $RT_2$ for compensating the temperature is expressed as follows $$RT_2 = R_o \frac{T_o}{T}$$

so $$VA_5 = \frac{R_o}{R} \cdot \frac{kT_o}{q} \ln(\frac{isv - Tv + i_{AVC} + ik}{i_s})$$

Thus it can be understood that the photographing information, namely the logarithmically compressed value of the sum of $isv - Tv$, $i_{AVC}$ and $ik$ is independent of the variation of the temperature.

It is easily possible to obtain a proper exposure independent of the temperature when the Apex operation is carried out on the information of the brightness of the object to be photographed and the photographing information independent of the temperature. When the information signal treated in the inverter $AP_6$ and the brightness information treated in $AP_4$ are operated in the operation amplifier OP, the output voltage $V_{op}$ of the operation amplifier OP is $$V_{op} = -\left\{(1 + \frac{R_4}{R_5}) \cdot \frac{R''_a}{R} \cdot \frac{kT_a}{q} \ln \left(\frac{isv - Tv + i_{AVC} + ik}{i_s}\right) + \frac{R_4}{R_5} \cdot \frac{R_a}{R} \cdot \frac{kT_a}{q} \ln \left(\frac{ip}{i_s}\right)\right\}$$

whereby, $R_{26} = R_{27}$.

Let $(1 + \frac{R_4}{R_5})R''_a$ be equal to $(\frac{R_7}{R_6} R_a)$, so $$V_{op} = -(1 + \frac{R_4}{R_5}) \cdot \frac{R''_a}{R} \cdot \frac{kT_a}{q}$$

$$\left\{ \ln (isv - Tv + i_{AVC} + ik) + \ln ip - 2\ln is \right\}$$

Let us suppose that the present light measuring circuit be of TTL open light measurement, so the output of the operation amplifier OP in Apex operation is expressed as follows:

The output of OP  $(Bv - Avo - Avc) + (Sv - Tv + Avc + K)$
  $= (Av - Avo) + K$
  $= \Delta Av + K$ ( $\because$ $Av = Bv + Sv - Tv$).

Namely, the output represents the number of steps to drive the aperture of the lens from the FNO. K is the exposure compensation, which is normally 0.

The circuit for indicating the exposure information (the aperture value in the present circuit) by means of the output of the operation amplifier OP is the current-voltage transducing circuit including $AP_7$. When an ampere meter with the coil consisting of copper wire is used with voltage mode for indication purpose the error of the exposure indication due to the temperature variation of the internal resistance of the coil takes place. Therefore, the ampere meter must be operated with the current mode in order to obtain the high precision exposure indication. Let the voltage at the dividing point of the resistances $R_{18}$ and $R_{19}$ be $e_k$, the current $i_m$ running through the ampere meter 18 is expressed as follows:

$$I_m = (\frac{1}{R_{22}} + \frac{1}{R_{22}} \cdot \frac{R_{21}}{R_{20}} + \frac{1}{R_{20}}) VA_6$$
$$- (\frac{1}{R_{10}} + \frac{1}{R_{12}} \cdot \frac{R_{11}}{R_{10}}) e_k$$

whereby it is understood that the current $i_m$ is independent of the internal resistance $R_M$ of the ampere meter. Further, the scale indication means DP in the present circuit is slided in functional engagement of the FNO of the lens.

Further, by means of the output $V_{op}$ of the operation amplifier OP the aperture is automatically set through the comparator CP and the magnet $Mg_2$ at the same time. Further, after a certain time determined by the resistance Rs whose value is determined in functional engagement with the shutter dial by the operation of the shutter release and by the condensor C the Schmitt trigger circuit $SM_1$ is operated in such a manner that the magnet $Mg_1$ is brought in the non magnetized state so as to control the shutter.

Figure 9:
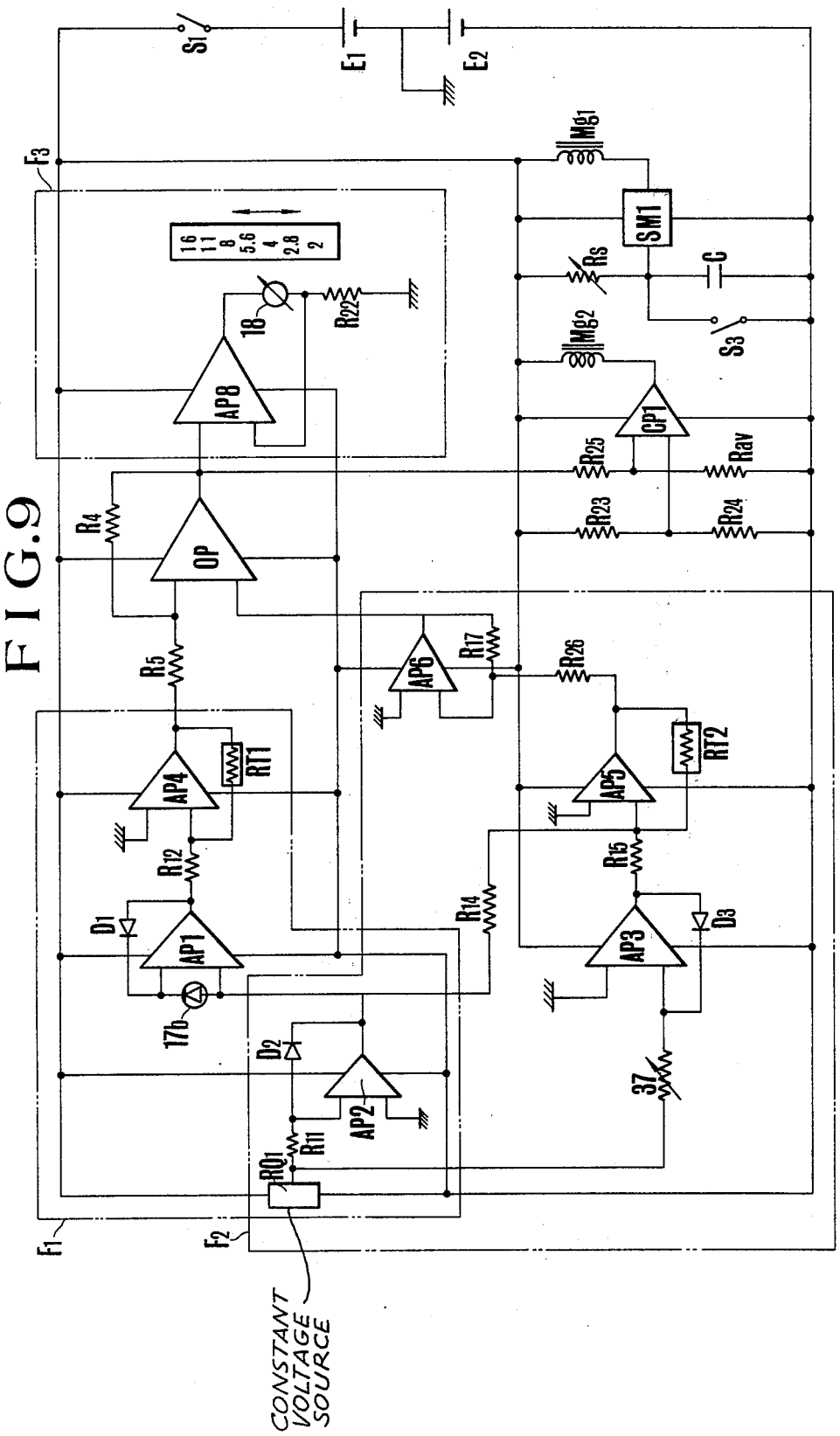
FIG. 9 shows the circuit diagram of FIG. 8, in which a photo voltaic element can be used as photo sensitive element.

FIG. 9 shows an embodiment of the present invention in which the photo sensitive element of the photo voltaic type is used, whereby the same elements as those of FIG. 8 present the same figures.

$17b$ in FIG. 9 is the photo sensitive element of the photo voltaic type which produces a photo electric current $i_p$ depending upon the brightness of the object to be photographed, which photo electric current is logarithmically compressed by means of the logarithmically compressing element $D_1$. The operation is same as in case of the photo sensitive element of the photo voltaic type of FIG. 8, so that its explanation is omitted.

Figure 10:
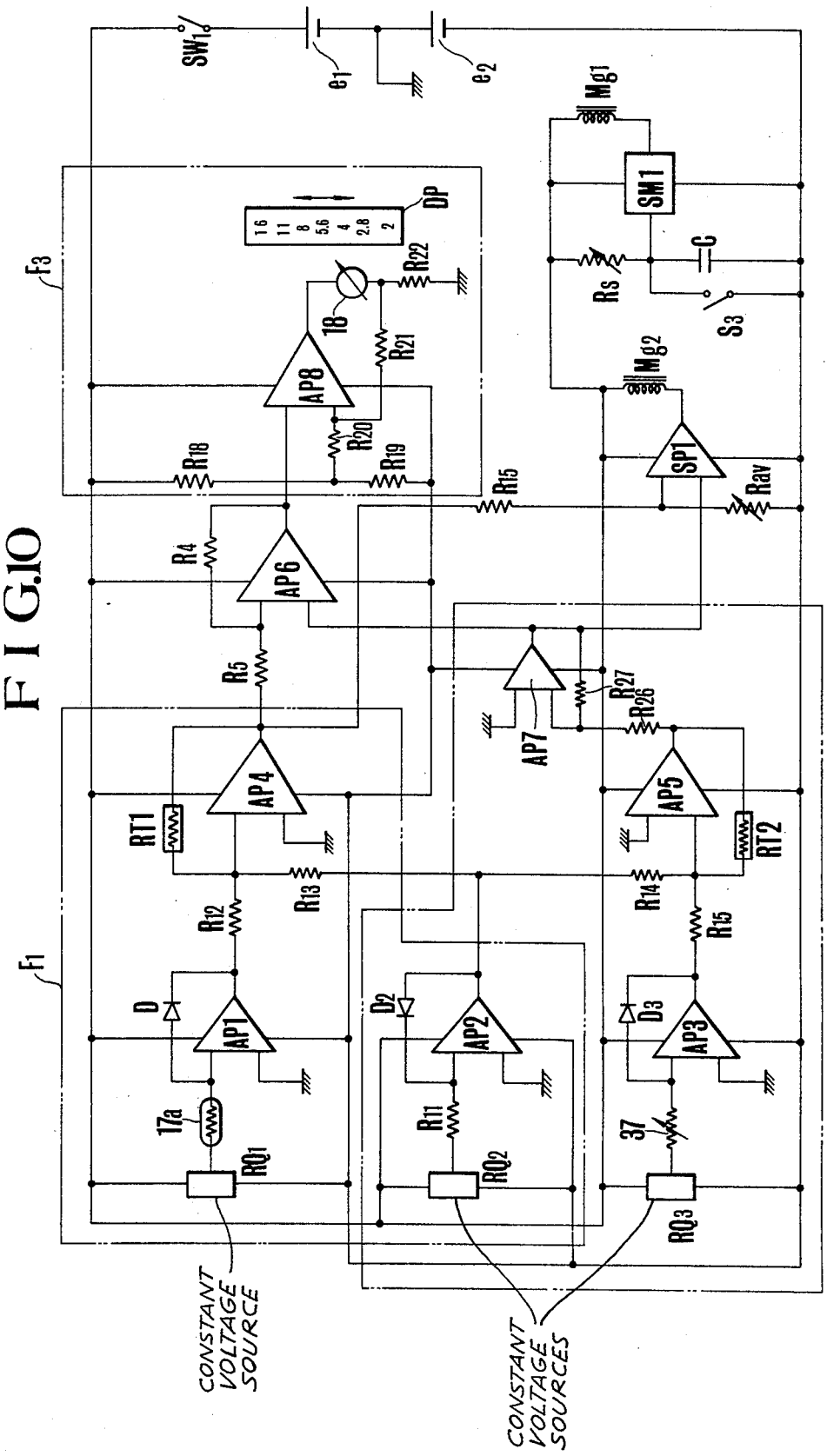
FIG. 10 shows a variation of the circuit of FIG. 8.

In the circuit shown in FIG. 10, the output of the amplifier $AP_4$ which is same as that of FIG. 8, namely the logarithmically compressed information of the brightness of the object to be photographed and the output of the amplifier $AP_6$, namely the compressed information compensated in respect to the temperature of the photographing operation input information are directly introduced into the comparator $CP_1$ in such a manner that the aperture is determined by means of the slide resistance for aperture setting.

Figure 11:
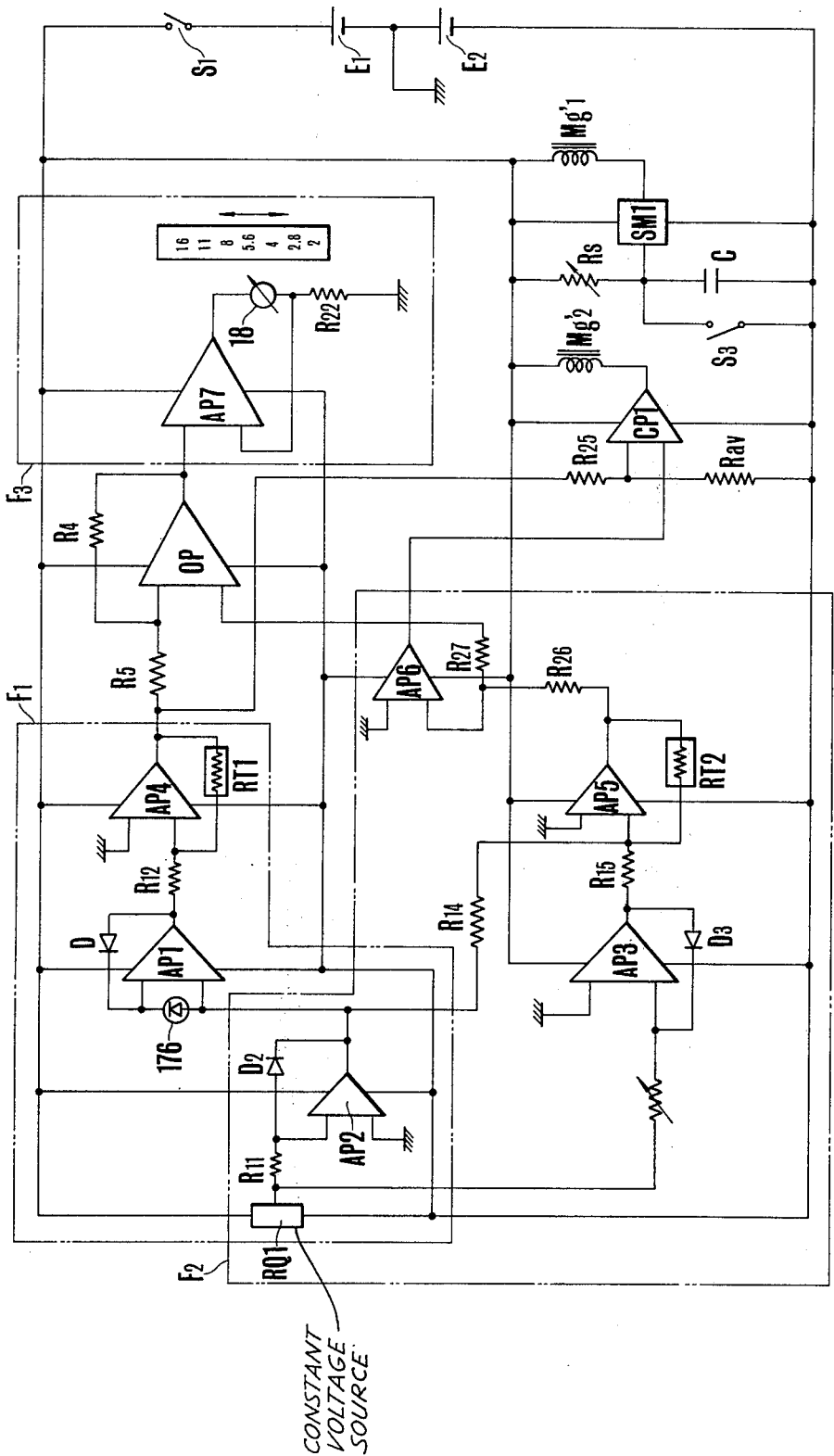
FIG. 11 shows a variation of the circuit of FIG. 9.

FIG. 11 shows the direct information comparison system of FIG. 9, whereby its operation is same as that of the system of FIG. 10.

As is clear from the above explanations, according to the present invention both of the compressed information of the brightness of the object to be photographed and of the compressed information of the photographing operation input are completely compensated in view of the temperature for the whole light measuring range so that the present invention is remarkably characterized in that various kinds of the information operation can be carried out by making use of these informations.

What is claimed is:

1. An exposure control apparatus for a camera comprising:
   means for measuring brightness of an object to be photographed, having a first logarithmic compression means to generate an electrical output signal corresponding to object brightness which is logarithmically compressed;
   means for setting photographing informations other than said object brightness, having a second logarithmic compression means to generate an electrical output signal corresponding to the set photographing informations which is logarithmically compressed;
   a temperature compensation means, having a biasing signal generation means and also having a third logarithmic compression means to logarithmically compress the biasing signal;
   an operation means which employs as its first input voltage a synthesized signal of the output signal of the said brightness measuring means and the output signal of said temperature compensation means and employs as its second input voltage a synthesized signal of the output signal of said photographing information setting means and the output signal of said temperature compensation means;

a diaphragm aperture indication meter having a meter pointer being driven corresponding to the output of said operation means;

means interposed between said operation means and the meter to convert the output voltage signal of said operation means to a constant current signal; and means to control the camera diaphragm by the output of said operation means.

2. A camera according to claim 1, in which the light measuring means has a photo-electromotive element and wherein the photo-electric current from said photo-element is logarithmically compressed by the first logarithmic compression means.

3. A camera according to claim 1, in which the photographing information setting means has a variable resistance for information setting.

4. A camera according to claim 1, which further comprises a diaphragm aperture indication plate to indicate the driven position of said meter pointer and wherein said indication plate is shifted corresponding to the fully open aperture F No of a photographing lens.

5. A camera according to claim 1, in which the diaphragm aperture control means further comprises:

means to generate an electrical signal which corresponds to the set value of diaphragm aperture;

means to compare the output signal of said signal generation means and the output signal of said operation means, wherein said comparison means provides an electric signal when both electric signals reach a prescribed value; and an electromagnet to set diaphragm aperture which is activated by the electrical signal of said comparison means.

* * * * *